US007847983B2

(12) United States Patent
Murakami

(10) Patent No.: US 7,847,983 B2
(45) Date of Patent: Dec. 7, 2010

(54) IMAGE READING APPARATUS

(75) Inventor: Ayumu Murakami, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 1169 days.

(21) Appl. No.: 10/671,725

(22) Filed: Sep. 29, 2003

(65) Prior Publication Data
US 2004/0105133 A1 Jun. 3, 2004

(30) Foreign Application Priority Data
Oct. 1, 2002 (JP) ............................ 2002-289087

(51) Int. Cl.
*H04N 1/04* (2006.01)
*G02B 5/32* (2006.01)
*G02B 5/08* (2006.01)
*G02F 3/00* (2006.01)
*G06K 7/10* (2006.01)

(52) U.S. Cl. .................. 358/474; 358/483; 358/494; 359/17; 359/205.1; 235/462.41; 235/462.35

(58) Field of Classification Search .............. 358/496, 358/221, 474, 497, 451, 484, 483, 494, 518, 358/482; 250/239; 403/343, 282; 355/67; 271/10.03; 347/171; 382/135, 313; 399/118; 606/308; 359/17, 205.1; 235/462.41, 462.35
See application file for complete search history.

(56) References Cited

U.S. PATENT DOCUMENTS

| | | | |
|---|---|---|---|
| 4,581,761 A * | 4/1986 | Ichinokawa et al. ......... 382/313 |
| 4,862,218 A * | 8/1989 | Tsunoda et al. ............. 399/118 |
| 4,899,226 A * | 2/1990 | Tanimoto et al. ............ 358/451 |
| 5,103,917 A * | 4/1992 | Moore ........................... 172/6 |
| 5,208,664 A * | 5/1993 | Yamada et al. .............. 358/518 |
| 5,311,330 A * | 5/1994 | Yeh ............................. 358/498 |
| 5,468,943 A * | 11/1995 | Gatto et al. .................. 358/496 |
| 5,526,141 A * | 6/1996 | Ogura et al. ................. 358/496 |
| 6,053,653 A * | 4/2000 | Tanaka et al. ............... 403/282 |
| 6,105,954 A * | 8/2000 | Magee et al. ............... 358/496 |
| 6,108,107 A * | 8/2000 | Suzuki ........................ 358/474 |
| 6,122,038 A * | 9/2000 | Cilke et al. .................. 358/482 |
| 6,146,383 A * | 11/2000 | Studer et al. ................. 606/308 |
| 6,147,339 A * | 11/2000 | Matsumoto .................. 358/474 |
| 6,194,713 B1* | 2/2001 | Kanazawa ................... 358/474 |
| 6,285,483 B1* | 9/2001 | Shia et al. .................... 358/474 |
| 6,359,704 B1* | 3/2002 | Horaguchi ................... 358/474 |
| 6,373,601 B1* | 4/2002 | Cheng ......................... 358/474 |

(Continued)

FOREIGN PATENT DOCUMENTS

JP 04-070647 6/1992

(Continued)

*Primary Examiner*—King Y Poon
*Assistant Examiner*—Akwasi M Sarpong
(74) *Attorney, Agent, or Firm*—Fitzpatrick, Cella, Harper & Scinto

(57) ABSTRACT

An image reading apparatus comprises an original placement portion on which an original is to be placed, optical unit for optically scanning the original on the original placement portion while moving relative to the original placement portion and a guide member that guides movement of the optical unit. The optical unit includes a sliding member having a screw portion that slides in contact with the guide member and a screw hole portion to which the sliding member is mounted. The screw portion of the sliding member is plastically deformable and screwed into the screw hole portion while being plastically deformed.

7 Claims, 7 Drawing Sheets

U.S. PATENT DOCUMENTS

| | | | |
|---|---|---|---|
| 6,380,962 B1 * | 4/2002 | Miyazaki | 347/171 |
| 6,628,431 B1 * | 9/2003 | Masuda et al. | 358/474 |
| 6,932,499 B2 * | 8/2005 | Ogura | 358/484 |
| 6,980,684 B1 * | 12/2005 | Munro et al. | 382/135 |
| 7,016,088 B2 * | 3/2006 | Yokota et al. | 358/474 |
| 7,057,778 B2 * | 6/2006 | Kawai et al. | 358/484 |
| 7,269,896 B2 * | 9/2007 | Edwardsen et al. | 29/828 |
| 7,310,171 B2 * | 12/2007 | Huang et al. | 358/474 |

FOREIGN PATENT DOCUMENTS

| | | |
|---|---|---|
| JP | 2001-222075 | 8/2001 |
| WO | WO 153707 A1 * | 7/2001 |

* cited by examiner

IMAGE READING APPARATUS

BACKGROUND OF THE INVENTION

1. Field of the Invention

The present invention relates to an image reading apparatus for reading an original image, and particularly relates to an image reading apparatus that can read image while a reading optical member is moved relative to a fixedly placed original.

2. Description of Related Art

Conventionally, a structure as shown in FIG. 4 has been widely used as an image reading apparatus for use in a copying machine or an image scanner or the like.

As shown in FIG. 4, a conventional image reading apparatus is provided with a platen glass 102 on which an original 101 to be read is to be placed, a white plate 103 used for shading compensation and a pressure plate 104 for pressing the original 101.

A lens unit 105 is provided for reduction-imaging reflection light from the original 101 that is illuminated with light, onto a CCD linear image sensor 106.

A first mirror unit 110 is composed of an original illumination lamp 111 in the form of a xenon lamp, a first reflection mirror 112 and an inverter 113 for turning the original illumination lamp 111 on. A second mirror unit 120 is composed of a second reflection mirror 121 and a third reflection mirror 122.

With the above-described structure, the original 101 placed on the platen glass 102 is read while the first mirror unit 110 and the second mirror unit 120 are moved in a scanning manner in the sub-scanning direction (that is, in the right direction in FIG. 4) by a stepping motor 107.

A reader 130 is provided with an adjusting mechanism for adjusting various factors of a read image, such as geometrical characteristics, the magnification or the resolution. Optical adjustment is to be performed by operating this image adjusting mechanism.

As such an image adjusting mechanism, there has been used an adjusting mechanism that adjusts the positions of the second reflection mirror 121 and the third reflection mirror 122 in the second mirror unit 120 along the direction indicated by arrow a in FIG. 4. This type of mechanism is disclosed in Japanese Patent Application Laid-Open No. 2001-222075.

In the following, this adjusting mechanism will be described with reference to FIGS. 5 and 6. Each of FIGS. 5 and 6 includes a plan view, front view, a left side view and a right side view.

Referring to FIG. 5, a second mirror frame 201 is a frame for supporting the second reflection mirror 121 and the third reflection mirror 122. The second mirror frame 201 has sliders 204 and 205 and sliders 206 and 207 provided at positions to be in slidable contact with a front optical rail 251 and a rear optical rail 252 respectively. The front optical rail 251 and the rear optical rail 252 constitute a scanning plane of the second mirror unit 120a.

The sliders 204 and 205 on one side are fixedly supported on a front slider frame 202. The sliders 206 and 207 on the other side are fixedly supported on a rear slider frame 203.

The front slider frame 202 is fixed by a screw 208 so that the position of the front slider frame 202 can be adjusted along the direction indicated by arrow b relative to the second mirror frame 201. A screw 209 is provided in the same manner.

In the above-described structure, the position of the front slider frame 202 relative to the second mirror frame 201 is adjusted based on geometrical characteristics of the image in order to adjust the inclination of the second reflection mirror 121 and the third reflection mirror 122 with respect to the thrust direction.

The rear slider frame 203 is supported and fixed on the second mirror frame 201. The rear slider frame 203 is constructed in such a way that its rotational position about a shaft 210 provided on the second mirror frame can be adjusted.

The position of the rear slider frame 203 relative to the second mirror frame 201 is adjusted in order to enhance the coplanarity of the sliders 204, 205, 206 and 207.

As shown in FIG. 6, a structure in which a second mirror frame 301 is secured to a front side plate 302 and a rear side plate 303 by means of screws or the like may also be adopted.

In this structure, the second reflection mirror 121 and the third reflection mirror 122 are supported on the second mirror frame 301. The second mirror frame 301 has sliders 304 and 305 and sliders 306 and 307 provided at positions to be in slidable contact with a front optical rail 351 and a rear optical rail 352 respectively. The front optical rail 351 and the rear optical rail 352 constitute a scanning plane of the second mirror unit 120b.

Details of the sliders 304 and 305 will be described with reference to FIGS. 7A and 7B. FIG. 7B is an enlarged partial view showing a part of FIG. 7A.

As shown in FIG. 7A, the slider 304 is provided with a sliding portion 304a for sliding in contact with the front optical rail 351 and a screw portion 304b provided perpendicularly to the optical rail surface.

The slider 305 has the same structure as the slider 304, namely, the slider 305 is provided with a sliding portion 305a for sliding in contact with the rear optical rail 352 and a screw portion 305b provided perpendicularly to the optical surface.

FIG. 7B is an enlarged view showing the screw portion 304b or 305b. As shown in FIG. 7B, screw hole portions 301a for engaging with the aforementioned screw portions 304b and 305b are formed on the second mirror frame 301.

Furthermore, as shown in FIG. 7B, a recessed portion 304c or 305c for engagement with an adjusting tool 361 is provided on each of the sliders 304 and 305. With this structure, the sliders 304 and 305 are rotated in the direction parallel to the surface of the front optical rail 351 and the surface of the rear optical rail 352 respectively by means of the adjusting tool 361 engaging with the recessed portions 304c and 305c, so that the positions of the sliders 304 and 305 in the direction indicated by arrow b in FIG. 7A can be adjusted relative to the second mirror frame 301.

The positions of the sliders 304 and 305 are adjusted based on geometrical characteristics of the image in order to adjust the inclination of the second reflection mirror 121 and the third reflection mirror 122 with respect to the thrust direction. In addition, they are adjusted in order to enhance the coplanarity of the sliders 304 to 307.

The sliders 304 and 305 that have been adjusted in their positions are fixed to the second mirror frame 301 by adhesive 371 so that the position of the sliders 304 and 305 will not be changed by scanning operation of the second mirror unit 120b.

However, the above-described prior art mechanism for adjusting the inclination of the second mirror 121 and the third mirror 122 and for adjusting the coplanarity of the sliders suffers from the following problems.

As shown in FIG. 5, it is necessary for that prior art that the second mirror frame 201 for supporting the second reflection mirror 121 and the third reflection mirror 122, the front slider frame 202 and the rear slider frame 202 for supporting the sliders 204 to 207 be constituted as separate members This results in an increase in the number of parts, which causes an increase in cost.

Furthermore, it is necessary for the structure to allow driver access for adjusting the inclination and the coplanarity in the direction toward the side surface of the second mirror unit 120. However, an frame (not shown) of the image reading apparatus is generally present at a position near the side of the second mirror unit 120a, and therefore, the operationality is very low.

On the other hand, the prior art shown in FIG. 6 does not suffer from the above-described problem. However, another problem arises in connection with the prior art shown in FIG. 6, that is, looseness of the sliders 304 and 305 on the second mirror frame 301 generated by the scanning operation of the second mirror unit 120b.

Recently, with an increase in the speed of the mirror unit, a materials having high sliding ability such as a polyolefin is used as the material of the sliders 304 to 307. Therefore, the adhesion force of the adhesive is made worse to a considerable degree, and the sliders 304 and 305 are easy to be loosened.

Such looseness of the sliders 304 and 305 causes inclination of the second reflection mirror 121 and the third reflection mirror 122, which, in turn, causes deterioration of geometric characteristics of read images.

One may consider to adhere the sliders 304 and 305 with an adhesive having a strong adhesion force. However, in the case that such an adhesive is used, adjustment of the height of the sliders 304 and 305 becomes impossible in the market, in spite that such adjustment is necessary for correcting geometrical characteristics of the image. Consequently, it is very difficult to adopt adhesion of the sliders 304 and 305 using an adhesive having a strong adhesion force.

In addition, in the sliders 304 and 305 and the second mirror frame 301 according to the prior art shown in FIG. 6, there is play in the mount portion of the sliders 304 and 305 to the second mirror frame 301 due to small play or backlash generated between the aforementioned screw portions 304b and 305b and the screw hole portions 301a, even when the adhesion force of the adhesive 371 to the sliders 304 and 305 is strong.

Due to the play in the mount portion of the sliders 304 and 305 to the second mirror frame 301, vibration will be generated upon the scanning operation of the second mirror unit 120b. As a result, for example, displacement in the image position upon reading a monochrome image or misregistration of colors in the case of a color scanner can be caused.

As per the above, in image reading apparatus such as scanners, positional displacement of images or misregistration of colors are generated due to looseness of slider members for performing position adjustment or play in the mount portion of the slider members, so that there arise problems concerning reliability and stability of the image reading apparatus. Therefore, it is desired to prevent the looseness in slider members such as the sliders 304 and 305 and play in the mount portion of the slider members.

SUMMARY OF THE INVENTION

An object of the present invention is to provide an image reading apparatus in which play and looseness of a slider of a moving optical member are eliminated.

Another object of the present invention is to provided an image reading apparatus in which the position of a moving optical member in the height direction can be easily adjusted.

Still another object of the present invention is to provide an image reading apparatus comprising:

an original placement portion on which an original is to be placed;

optical means for optically scanning the original on the original placement portion while moving relative to the original placement portion; and a guide member that guides movement of the optical means;

wherein the optical means includes a sliding member having a screw portion that slides in contact with the guide member and a screw hole portion to which the sliding member is mounted, the screw portion of the sliding member being plastically deformable and screwed into the screw hole portion while being plastically deformed.

Other objects and features of the present invention will become apparent from the following description.

DESCRIPTION OF THE PREFERRED EMBODIMENT

Figure 1:
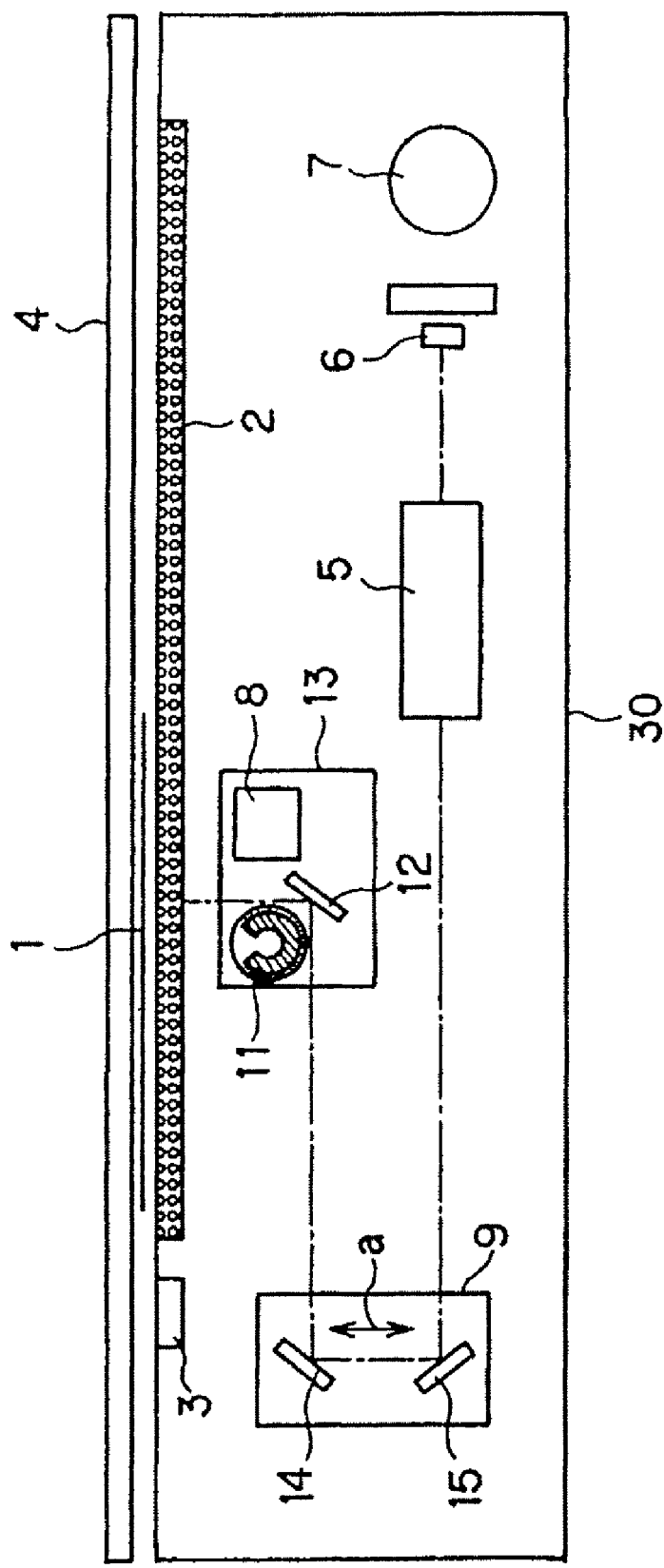
FIG. 1 is a cross sectional view schematically showing an image reading apparatus using slider portions according to an embodiment of the present invention.

In the following, an embodiment of the present invention will be described with reference to the accompanying drawings.

In the drawings, the same parts are designated with the same reference signs and redundant description thereof will be omitted.

(Image Reading Apparatus)

First, an image reading apparatus according to an embodiment of the present invention will be described. FIG. 1 is a cross sectional view schematically showing the image reading apparatus.

As shown in FIG. 1, the image reading apparatus according to this embodiment is provided with a platen glass 2 serving as original placement means on which an original 1 to be read is to be placed, a white plate 3 used for shading compensation and a pressure plate 4 for pressing the original 1. In the interior of the image reading apparatus according to the embodiment, there is provided a lens unit 5, a CCD linear image sensor 6, a stepping motor 7, a first mirror unit 8 serving as first scanning means and a second mirror unit 9 serving as second scanning means.

The lens unit 5 is provided for reduction-imaging reflection light from the original 1 that is illuminated with light, onto the CCD linear image sensor 6.

The first mirror unit 8 is composed of an original illumination lamp 11 in the form of a xenon lamp, a first reflection mirror 12 serving as a first reflection system and an inverter 13 for turning the original illumination lamp 11 on. The second mirror unit 9 is composed of a second reflection mirror 14 serving as a second reflection system and a third reflection mirror 15 serving as a third reflection system.

With the above-described structure, the original 1 placed on the platen glass 2 is read while the first mirror unit 8 and the second mirror unit 9 are moved in a scanning manner in the sub-scanning direction (that is, in the right direction in FIG. 1) by a stepping motor 7.

A reader 30 is provided with an adjusting mechanism for adjusting various factors of a read image, such as geometrical characteristics, the magnification or the resolution. Optical adjustment is to be performed by operating this image adjusting mechanism.

(Structure of Slider Member)

Slider members used in the image reading apparatus according to the embodiment that has the above-described structure will be described in the following. FIGS. 2A, 2B, 2C and 3 show a slider member according to this embodiment. In addition, the description will be made with additional reference to FIGS. 6 and 7 as the need arises. In those drawings, description of portions in the structure that are the same as those in the prior art will be omitted.

Figure 2A:
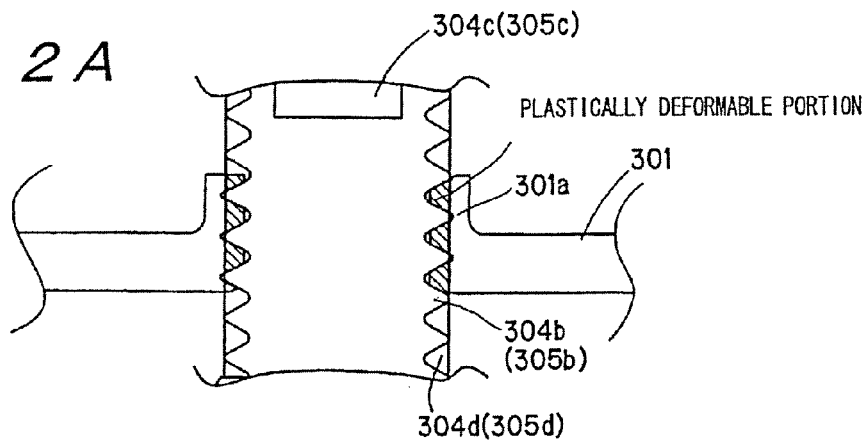
FIG. 2A is a cross sectional view showing a slider portion to be used in the image reading apparatus according to the embodiment of the present invention.
Figure 2B:
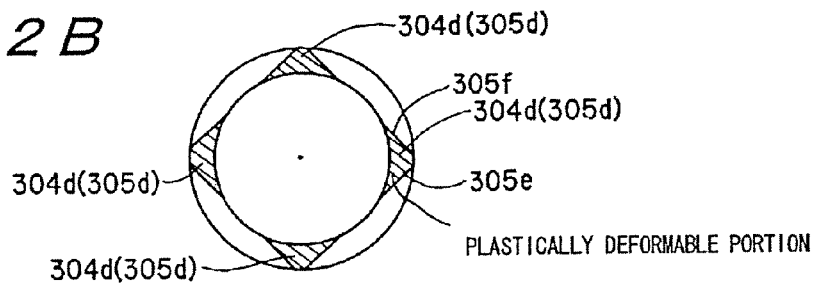
FIG. 2B is a cross sectional view showing the slider portion to be used in the image reading apparatus according to the embodiment of the present invention.
Figure 2C:
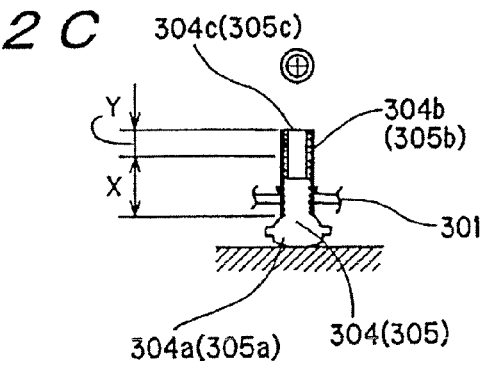
FIG. 2C is a side view showing the slider portion to be used in the image reading apparatus according to the embodiment of the present invention.

FIG. 2A shows a screw portion 304b or 305b of the slider 304 or 305. FIG. 2B is a cross sectional view in the axial direction of the screw portion 304b or 305b of the slider 304 or 305. FIG. 2B is a cross sectional view taken on the plane orthogonal to the axial direction.

As shown in FIG. 2B, on the root portion of the thread of the screw portion (i.e. the threaded portion) 304b (305b) of the slider 304 (305), there is provided four projected portions 304d (305d) along the circumference. Each of the projected portions 304d (305d) has a convex shape extending from the root of the screw thread up to the major diameter of the screw. Each of the projected portion 304d (305d) has tapered portions 305e and 305f in the circumferential direction.

The projected portions 304d (305d) are provided in the range along the axial direction of the screw portion 304b (305b) indicated by double-sided arrow X. In other words, the projected portions 304d (305d) are provided in the area other than the tip end area of the screw portions 304b (305b), and they are not provided in the tip end area of the screw portion 304b (305b) indicated by arrow Y above arrow X.

Figure 6:
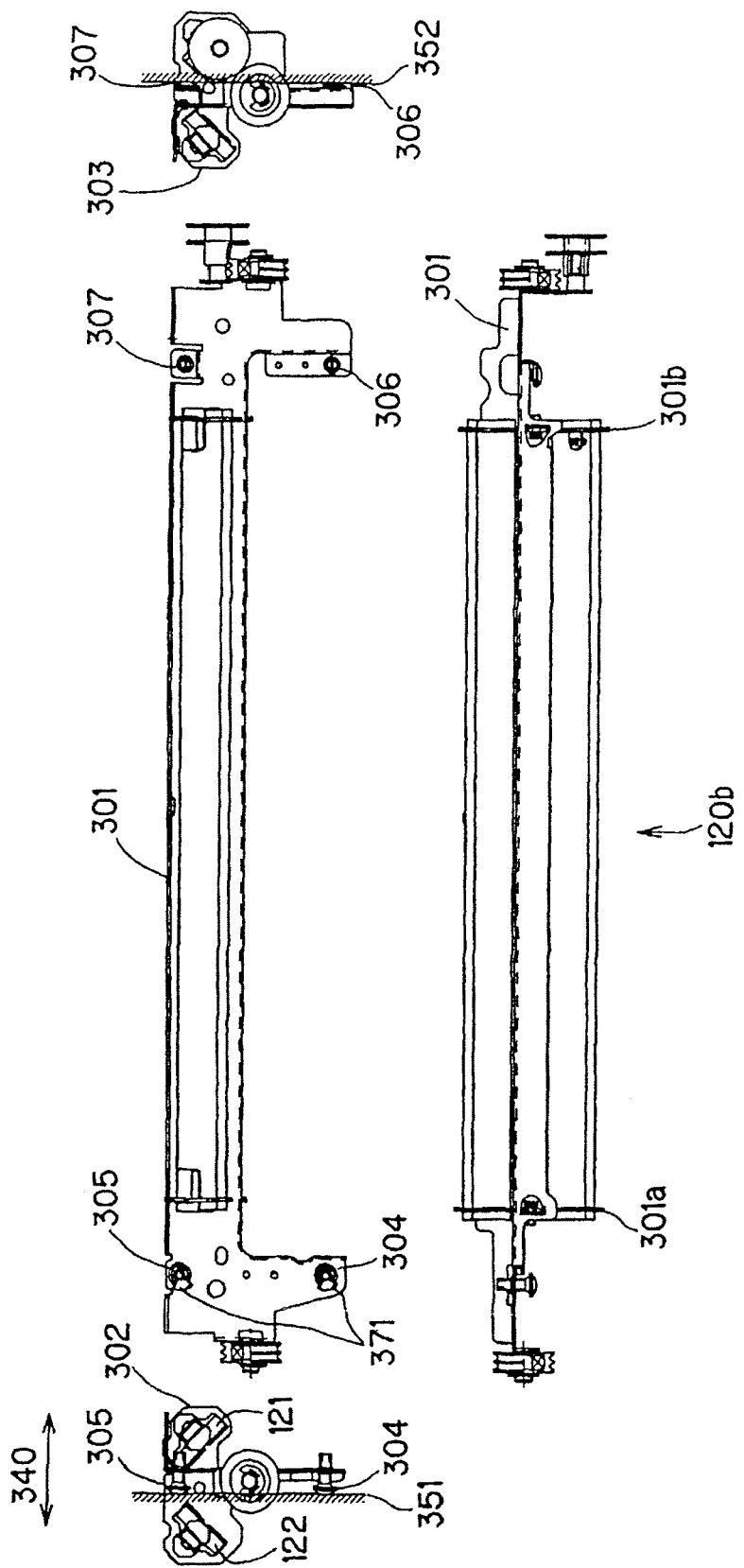
FIG. 6 includes a front view, a plan view, a right side view and left side view showing an example of a slider of an image reading apparatus.
Figure 7A:
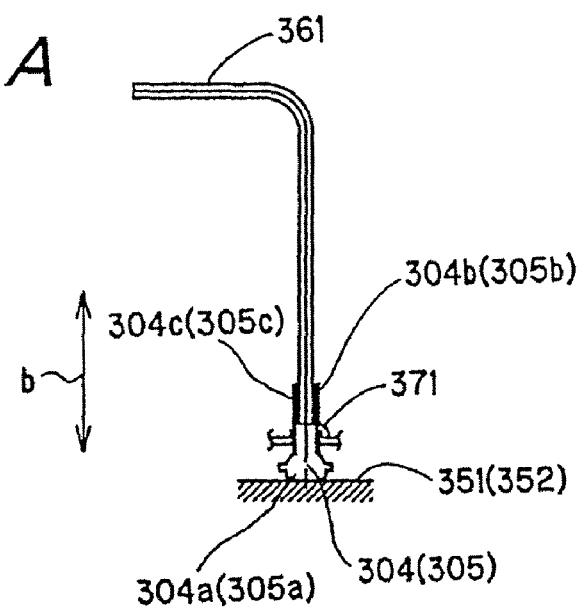
FIG. 7A is a side view illustrating a problem concerning a slider portion used in an image forming apparatus.
Figure 7B:
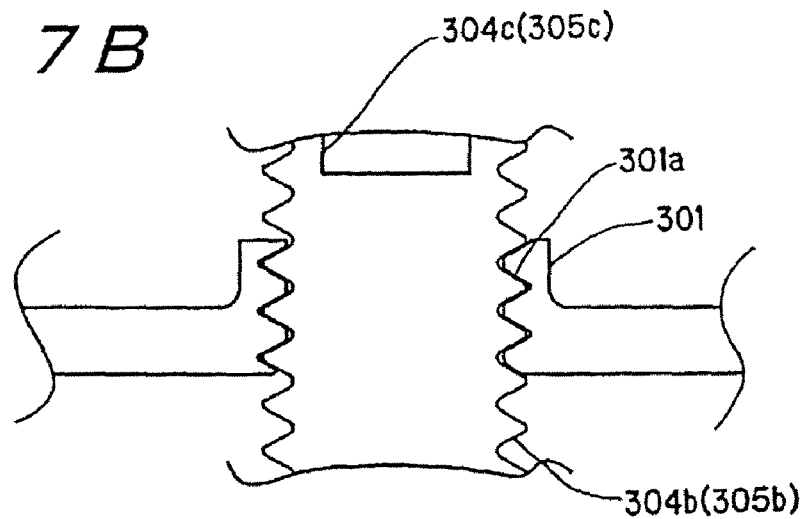
FIG. 7B is an enlarged cross sectional view for illustrating the problem concerning the slider portion used in an image reading apparatus.

When the slider 304 (305) is screwed into the second mirror frame 301 shown in FIG. 6, the projected portions 304d (305d) of the slider 304 (305) are threaded into the screw hole portion 301a of the second mirror frame while being plastically deformed.

In this way, the slider 304 (305) is screwed into the screw hole portion 301a of the second mirror frame 301 with the projected portions 304d (305d) being in plastically deformed states. With this feature, the loosening torque of the slider 304 (305) in relation to the second mirror frame 301 is increased. Consequently, loosening of the sliders 304 and 305 from the second mirror frame 301 due to the scanning operation of the second mirror unit 120b can be avoided.

The projected portions 304d (305d) of the slider 304 (305) are not provided in the tip end area (i.e. the area along the axial direction indicated by arrow Y) of the screw portion 304b (305b). Consequently, it is easy to commence screwing of the sliders 304 and 305 into the second mirror frame 301.

In addition, the projected portions 304d (305d) are plastically deformed by the screw hole portion 301a of the second mirror frame 301 while guided by the tapered portions 305e and 305f of the projected portions 304d (305d). Therefore, an increase in the screw torque is small, so that it is possible to prevent problems that might occur upon assembling, such as increase in the screw torque or sticking of the sliders 304 and 305 to the second mirror frame as a result of bending of the sliders 304 and 305 from occurring.

In the above-described sliders 304 and 305 and the second mirror frame 301, play in the mount portion between the aforementioned screw portion 304b (305b) and the screw hole portion 301a is absorbed by the plastic deformation of the projected portions 304d (305d). Consequently, play in the mount portion can be eliminated, and vibration of the second mirror unit 120b during the scanning operation can be prevented from occurring.

In this embodiment, the plastic deformation of the projected portions 304d (305d) of the slider 304 (305) is intended to increase the loosening torque of the slider 304 (305) from the second mirror frame 301.

However, a similar effect can be attained by designing the shape of the thread of the screw portion 304b (305b) of the slider 304 (305) as an expanded shape as compared to the shape of the internal thread of the screw hole portion 301a of the second mirror frame 301 so that they will overlap (interfere) with each other.

As per the above, in the image reading apparatus according to the embodiment of the present invention, the slider 304 (305) is screwed into the screw hole portion 301a of the second mirror frame 301 with the projected portions 304d (305d) being in plastically deformed states. With this feature, the loosening torque of the slider 304 (305) in relation to the second mirror frame 301 is increased. Consequently, loosening of the sliders 304 and 305 from the second mirror frame 301 due to the scanning operation of the second mirror unit 120b can be avoided.

Consequently, inclination of the second reflection mirror 121 and the third reflection mirror 122 caused by loosening of the sliders 304 and 305 can be prevented from occurring, and therefore, deterioration of geometrical characteristics of read images can be avoided.

In addition, in the sliders 304 and 305 and the second mirror frame 301 of the image reading apparatus according to this embodiment, play in the mount portion of the screw portions 304b and 305b to the screw hole portions 301a can be suppressed by virtue of plastic deformation of the projected portions 304d and 305d.

Consequently, it is possible to prevent vibration of the second mirror unit 120b upon the scanning operation, and therefore it is possible to avoid deteriorations of so-called read image characteristics such as positional displacement of images and misregistration of colors in the case that multiple colors are read.

While one embodiment of the present invention has been described in the foregoing, the present invention is not limited to the above-described embodiment but various modification can be made based on the technical concept of the present invention.

For example, the materials and the structures of the image reading apparatus that have been described in connection with the embodiment are mere examples, and therefore different materials and structures of the image reading apparatus may be adopted in accordance with requirements.

For example, while the above description of the embodiment has been directed to the sliders of the second mirror unit 120b, the structure same as the structure of this embodiment may be applied to the sliders of the first mirror unit 110 serving as the first scanning means. In this case also, the same advantageous effects can be attained.

Figure 3:
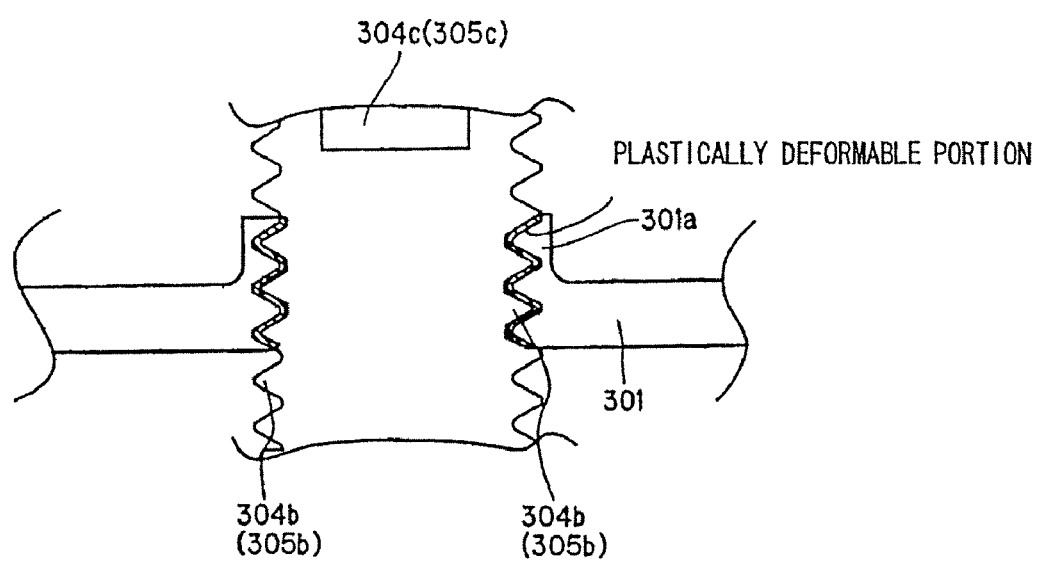
FIG. 3 is an enlarged cross sectional view showing another slider portion to be used in the image reading apparatus according to the embodiment of the present invention.
Figure 4:
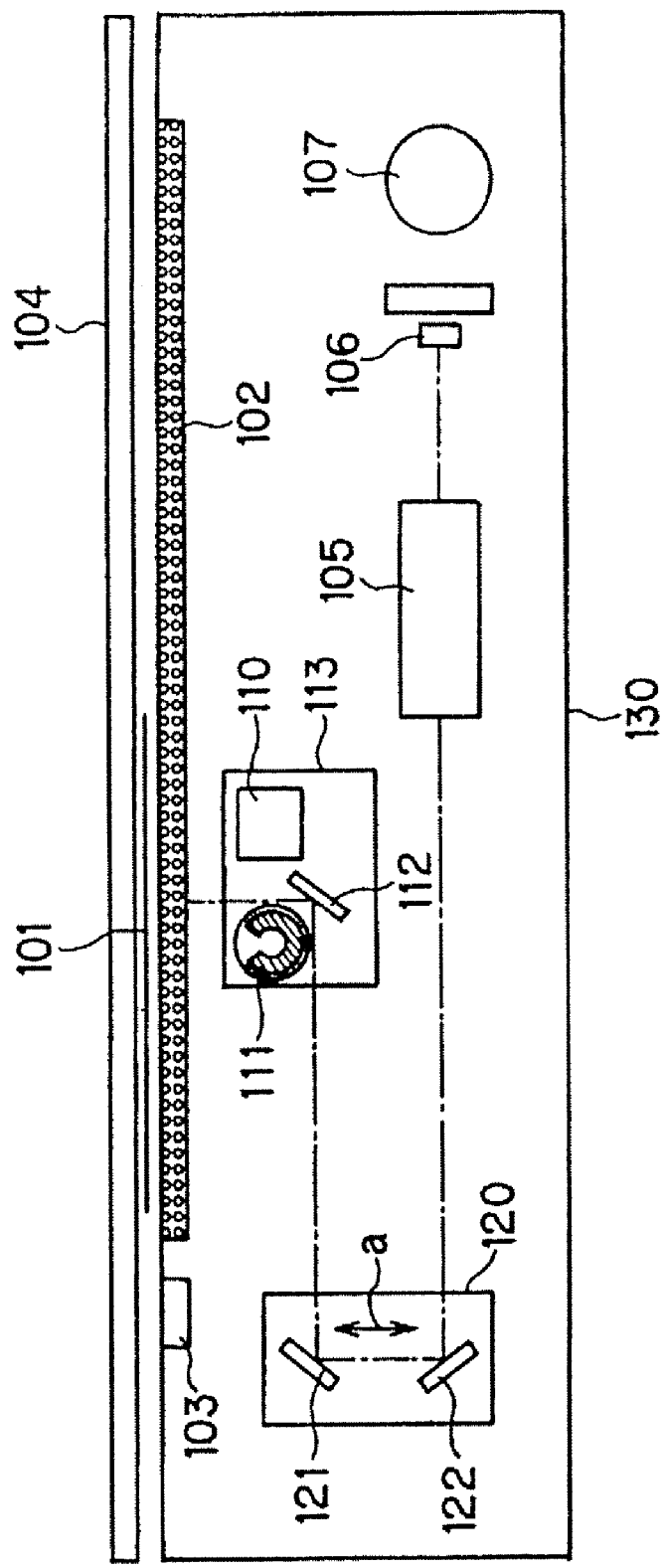
FIG. 4 schematically shows an image reading apparatus.
Figure 5:
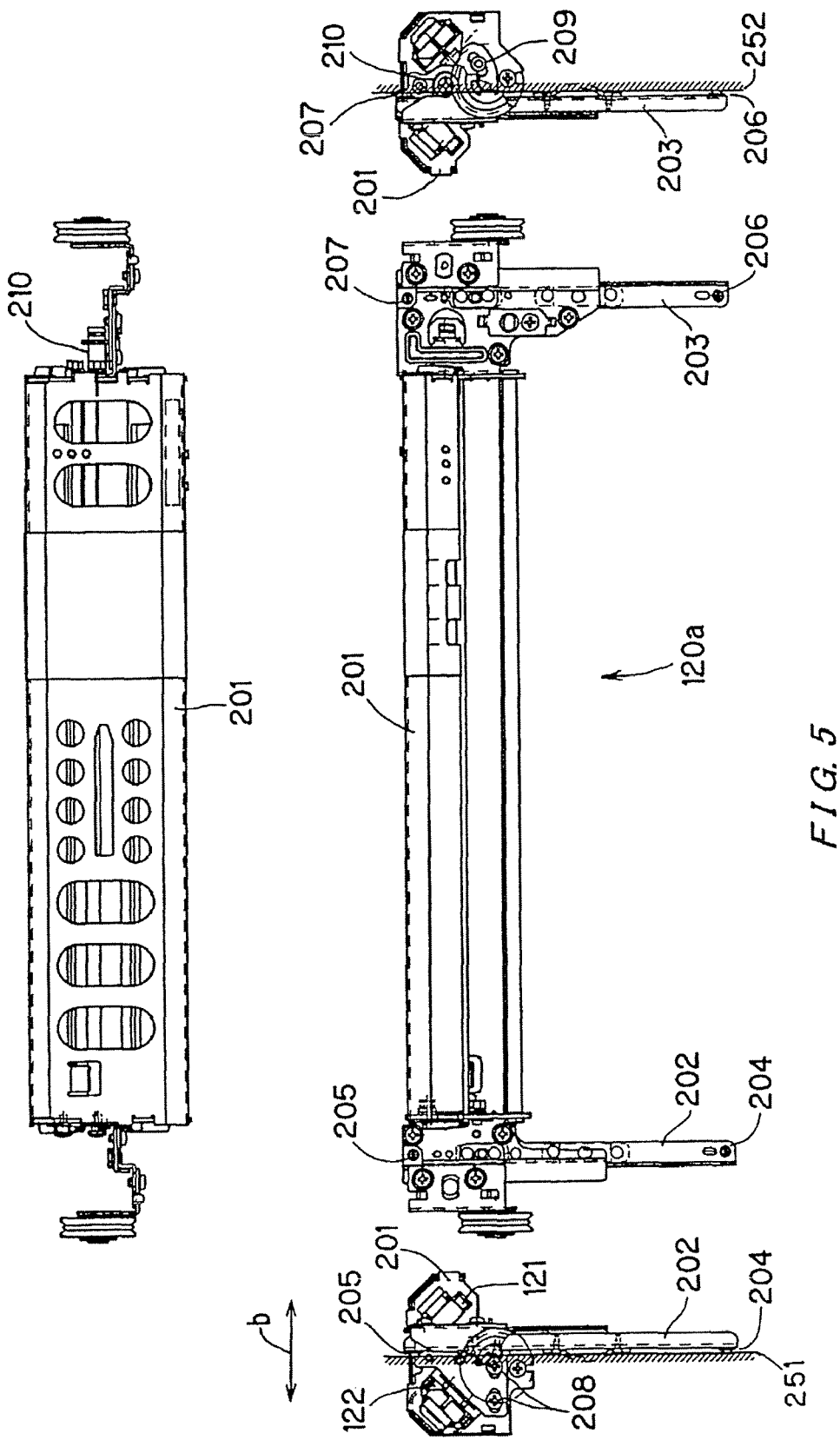
FIG. 5 includes a front view, a plan view, a right side view and left side view showing an example of a slider of an image reading apparatus.

Furthermore, while in the above-described embodiment, the overlapping screw portions 304 and 305 have the shape shown in FIGS. 2 and 3, the overlapping screw portions 304b and 305b of the sliders 304 and 305 having other shapes than those shown in FIGS. 2 and 3 can attain the same advantageous effects so long as the screw portions 304b and 305b of the sliders 304 and 305 overlap with the screw hole portions 301 of the second mirror frame 301.

As per the above, according to the image reading apparatus according to the present invention, it is possible to avoid loosening and play in mounting of sliders that can be adjusted in their positions while allowing easy adjustment of inclination and easy adjustment of coplanarity. Consequently, it is possible to avoid deterioration of geometrical characteristics or deterioration of image characteristics of read images such as positional displacement of images or misregistration of colors in the case of color images.

While an embodiment of the present invention has been described in the foregoing, it will be understood that the present invention is not restricted to specific features of the embodiment, but various modification can be made without departing from the scope and spirit of the present invention.

What is claimed is:

1. An image reading apparatus comprising:
an original placement portion on which an original is to be placed;
an optical unit provided below the original placement portion and configured to move relative to the original placement portion; and
a guide member that guides movement of the optical unit and supports the optical unit from below;
wherein the optical unit includes a unit frame configured to hold an optical element, and includes a slider configured to slide on the guide member, said slider having a screw that is vertically threaded in a screw hole formed in the unit frame and that rides the guide member,
wherein a vertical position of the unit frame relative to the guide member is adjusted in accordance with a rotating amount of the screw, such that the optical element is thereby raised or lowered in order to adjust an imaging parameter of an output image;
wherein a plurality of projecting portions are provided on a root of a thread of the screw along a circumference of the thread, and are provided in an area other than a tip end area of the screw,
wherein each of the projecting portions of the screw are plastically deformable into a different shape and are plastically deformed while being screwed into the screw hole, and wherein the plastic deformation of the projecting portions of the screw absorbs play in a mount portion between the screw and the screw hole formed by the unit frame.

2. An image reading apparatus according to claim 1, wherein play between the screw and the screw hole is substantially eliminated by plastic deformation of the projecting portions of the screw.

3. An image reading apparatus according to claim 1, wherein the tip end of the screw has an engagement portion with which a rotating tool engages.

4. An image reading apparatus according to claim 1, wherein the screw is made of a resin material.

5. An image reading apparatus according to claim 1, wherein a plurality of screws are provided at respective end portions of the optical unit with respect to a direction orthogonal to a moving direction of the optical member respectively.

6. An image reading apparatus according to claim 1,
further comprising an illuminating unit configured to illuminate the original placement portion,
wherein the optical element is a mirror configured to reflect a reflection light from the original on the original placement portion that is illuminated with the illuminating unit.

7. An image reading apparatus comprising:
an original illumination member;
a reflection system configured to reflect light from the original;
a scanning member configured to move the reflection system;
a support surface configured to support the scanning member; and
a plurality of screws configured to be mounted in a plurality of screw holes formed on the scanning member, wherein a head of each of the screws slides in contact with the support surface;
wherein a vertical position of the scanning member relative to the support surface is adjusted in accordance with a rotating amount of the screw, such that an optical element is thereby raised or lowered in order to adjust an imaging parameter of an output image; and
wherein each of the screws has a plurality of plastically deformable projecting portions on a root of a thread thereof along a circumference of the thread, the projecting portions provided in an area other than a tip end area of the screw, wherein each of the projecting portions of the screw are plastically deformable into a different shape and are plastically deformed while being screwed into the screw hole, wherein the plastic deformation of the projecting portions of the screw absorbs play in a mount portion between the screw and the screw hole, and wherein the projecting portions and the screw hole engage each other in an interference fit in the axial direction of the screw.

* * * * *